United States Patent [19]

Okamoto

[11] Patent Number: 4,999,388

[45] Date of Patent: Mar. 12, 1991

[54] BRANCHED POLYESTER RESIN COMPOSITION HAVING ENHANCED MELT VISCOSITY

[75] Inventor: Kevin T. Okamoto, Evansville, Ind.

[73] Assignee: General Electric Company, Pittsfield, Mass.

[21] Appl. No.: 406,905

[22] Filed: Sep. 14, 1989

[51] Int. Cl.⁵ .............................................. C08L 63/06
[52] U.S. Cl. .................................... 523/400; 523/404; 523/415; 523/420; 523/451; 523/455; 523/457; 525/437; 525/438; 525/440; 525/444
[58] Field of Search .............. 523/400, 404, 415, 420, 523/451, 455, 457; 525/437, 438, 440, 444

[56] References Cited

U.S. PATENT DOCUMENTS 3,723,568 3/1973 Hoeschele .......................... 525/438
4,113,692 9/1978 Wambach .......................... 524/534
4,124,561 11/1978 Phipps, Jr. et al. ................. 524/449
4,141,882 2/1979 Kodama et al. ................... 523/435
4,336,343 6/1982 Aharoni .............................. 523/455
4,341,677 7/1982 Tamosauskas ..................... 523/421
4,483,948 11/1984 Tamosauskas ..................... 523/205

FOREIGN PATENT DOCUMENTS 2411465 3/1974 Fed. Rep. of Germany .
2098231 5/1981 United Kingdom .

Primary Examiner—John Kight, III
Assistant Examiner—Sam A. Acquah
Attorney, Agent, or Firm—Hedman, Gibson, Costigan & Hoare

[57] ABSTRACT

Branched polyester resins comprising a polyepoxy compound, a hindered phenol and a catalyst compound having enhanced melt viscosity are disclosed.

50 Claims, No Drawings

BRANCHED POLYESTER RESIN COMPOSITION HAVING ENHANCED MELT VISCOSITY

The present invention relates to branched polyester resin compositions. More particularly the present invention relates to branched polyester resins having enhanced melt viscosity. The present invention also relates to a method for enhancing the viscosity of branched polyester resin compositions.

BACKGROUND OF THE INVENTION

Linear polyesters, such as poly(ethylene terephthalate) or PET, and poly(butylene terephthalate) or PBT, are widely used in the preparation of articles by forming methods such as injection molding. Many of their properties, including chemical stability, solvent resistance and low permeability to gases, make them attractive candidates for such forming operations as blow molding, profile extrusion and thermoforming. One problem in such operations is the relatively low melt viscosities of the polyesters, as a result of which the formed articles do not adequately retain their shape immediately after forming and before they have cooled.

In recent years, methods have been developed for increasing the melt viscosities and melt strengths of such polyesters. For example, Japanese Kokai 75/96648 and Japanese Kokai 81/116749 describe the reaction of various thermoplastic polyesters with triglycidyl isocyanurate (TGIC). In this reaction, a branched polyester is apparently formed by reaction of carboxylic acid end groups of the polyester with each of the epoxy groups. By reason of this branching, the polyester displays low viscosity at high shear rates, as during extrusion, and high viscosity and melt elasticity at low shear rates, as during hanging of a blow-molded parison, which ensures dimensional stability.

More recently, improved methods for conducting this reaction have been developed. U.S. patent application, Ser. No. 185,534, filed Apr. 21, 1988, describes the initial preparation of a reactive concentrate by the reaction of a relatively large amount of the polyepoxide with a linear polyester having a measurable proportion of free carboxylic acid end groups. The reactive concentrate is then melt blended with further linear polyester to form the desired branched polyester product. A somewhat different method, employing a concentrate in which the polymer is non-reactive with the polyepoxide, is the subject of U.S. patent application Ser. No. 125,859, filed Nov. 27, 1987. Both applications are copending and commonly owned herewith.

Kodama et al., U.S. Pat. No. 4,141,882 describes obtaining a polyester composition having high melt viscosity by blending a polyester comprising at least 80 percent by mole of ethylene terephthalate units with (1) an epoxy compound (A) and at least one organic compound (B) capable of reacting with the epoxy compound (A), or (2) a product of the melt reaction of epoxy compound (A) with the organic compound (B).

Blaschke et al, United Kingdom Patent No. 2,098,231 describe shaped bodies formed of polytetramethylene terephthalate stabilized with TGIC. The patentees also teach the addition of hindered phenolic stabilizers to the polyester compositions.

Commonly assigned, U.S. patent application Ser. No. 07/322,471, filed Mar. 3, 1989, now allowed discloses adding an effective amount of a catalyst compound to a polyester and polyepoxy compound composition to increase the melt viscosity of the polyester polyepoxy compound composition. However, no suggestion is made that still further melt viscosity enhancement can be obtained by adding an additional catalyst compound to a polyester composition comprising polyepoxy compounds and a hindered phenolic thermal stabilizer.

It has now unexpectedly been found that products with still better viscosity properties are obtained where at least one additional catalyst compound is added to a polyester composition comprising a polyester resin, a polyepoxy compound and a hindered phenolic thermal stabilizer. Surprisingly the addition of the additional catalyst compound significantly enhances the melt viscosity and melt strength of polyester compositions. This also enables the producer to obtain a product resin of equivalent melt viscosity while employing less polyepoxy compound.

SUMMARY OF THE INVENTION

According to the present invention there is provided an improved thermoplastic resin composition comprising: (a) a polyester resin; (b) a polyepoxy compound; (c) a hindered phenol thermal stabilizer; the improvement comprising (d) an effective amount of at least one additional catalyst compound; to either (1) increase the viscosity of the composition over that of a composition comprising equivalent amounts of (a), (b) and (c); or (2) to produce a composition having the same viscosity as a composition comprising (a), (b) and (c) but with a reduction in the amount of (b) employed.

Also according to the present invention there is provided a method for producing an improved thermoplastic resin composition comprising (i) preparing a composition comprising (a) a polyester resin, (b) a polyepoxy compound, and (c) a hindered phenol thermal stabilizer; and (ii) adding an effective amount of at least one additional catalyst compound; whereby either (1) the viscosity of the composition is increased over a composition comprising equivalent amounts of components (a), (b) and (c); or (2) the viscosity of the composition is the same and the amount of component (b) is reduced.

DETAILED DESCRIPTION OF THE PRESENT INVENTION

Component (a) of the present invention comprises polyester resins. Polyesters generally for use herein are derived from an aliphatic or cycloaliphatic diol, or mixtures thereof, containing from 2 to about 10 carbon atoms and at least one aromatic dicarboxylic acid. Preferred polyesters are derived from an aliphatic diol and an aromatic dicarboxylic acid and have repeated units of the following general formula:

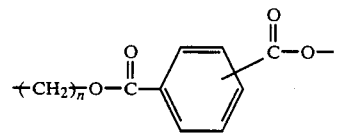

wherein n is an integer of from 2 to 6. The most preferred polyesters are poly(ethylene terephthalate) and poly(1,4-butylene terephthalate).

Also contemplated herein are the above polyesters with minor amounts, e.g., from 0.5 to about 5 percent by weight, of units derived from aliphatic acid and/or aliphatic polyols to form copolyesters. The aliphatic polyols include glycols, such as poly(ethylene glycol).

All such polyesters can be made following the teachings of, for example, U.S. Pat. Nos. 2,465,319 and 3,047,539.

The polyesters which are derived from a cycloaliphatic diol and an aromatic dicarboxylic acid are prepared, for example, by condensing either the cis- or trans- isomer (or mixtures thereof) of, for example, 1,4-cyclohexanedimethanol with an aromatic dicarboxylic acid so as to produce a polyester having recurring units of the following formula:

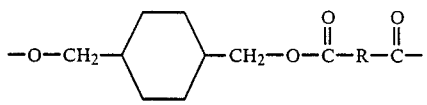

wherein the cyclohexane ring is selected from the cis- and trans- isomers thereof and R represents an aryl radical containing 6 to 20 carbon atoms and which is the decarboxylated residue derived from an aromatic dicarboxylic acid.

Examples of aromatic dicarboxylic acids represented by the decarboxylated residue R are isophthalic or terephthalic acid, 1,2-di(p-carboxyphenyl)ethane, 4,4'-dicarboxydiphenyl ether, etc, and mixtures of these. All of these acids contain at least one aromatic nucleus. Acids containing fused rings can also be present, such as in 1,4- or 1,5-naphthalenedicarboxylic acids. The preferred dicarboxylic acids are terephthalic acid or a mixture of terephthalic and isophthalic acids.

Another preferred polyester may be derived from the reaction of either the cis- or trans- isomer (or a mixture thereof) of 1,4-cyclohexanedimethanol with a mixture of isophthalic and terephthalic acids. Such a polyester would have repeating units of the formula:

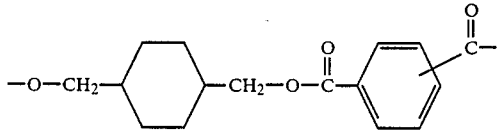

Still another preferred polyester is a copolyester derived from a cyclohexane dimethanol, an alkylene glycol and an aromatic dicarboxylic acid. These copolyesters are prepared by condensing either the cis- or trans- isomer (or mixtures thereof) of, for example, 1,4-cyclohexanedimethanol and an alkylene glycol with an aromatic dicarboxylic acid so as to produce a copolyester having units of the formula:

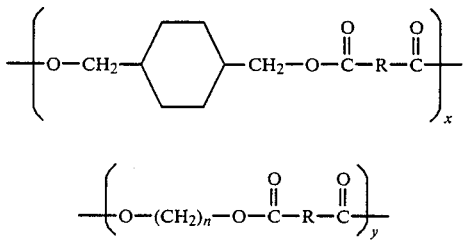

wherein the cyclohexane ring is selected from the cis- and trans- isomers thereof, R is as previously defined, n is an integer of 2 to 6, the x units comprise from about 10 to about 90 percent by weight and the y units comprise from about 90 to about 10 percent by weight.

Such a preferred copolyester may be derived from the reaction of either the cis- or trans- isomer (or mixtures thereof) of 1,4-cyclohexanedimethanol and ethylene glycol with terephthalic acid in a molar ratio of 1:2:3. These copolyesters have repeating units of the following formula:

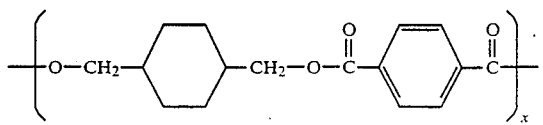

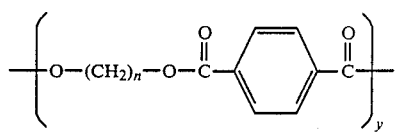

wherein x and y are as previously defined.

The polyesters described herein are either commercially available or can be produced by methods well known in the art, such as those set forth in, for example, U.S. Pat. No. 2,901,466.

The polyesters used herein have an intrinsic viscosity of from about 0.4 to about 2.0 dl/g as measured in a 60:40 phenol/tetrachloroethane mixture or similar solvent at 23°-30° C.

The polyester resin component can vary widely in amount. Preferably the polyester resin component is present in an amount ranging from about 99 to about 100 weight percent based on the weight of the polyester resin, polyepoxy compound, hindered phenol thermal stabilizer and additional catalyst compound combined. Where a blend of poly(ethylene terephthalate) and poly(1,4-butylene terephthalate) is employed, the polyester resin component will comprise from about 1 to about 99 parts by weight poly(ethylene terephthalate) and from about 99 to about 1 part by weight poly(1,4-butylene terephthalate) based on 100 parts by weight of the poly(ethylene terephthalate) and poly(1,4-butylene terephthalate) combined. However, other polyester blends are also contemplated within the scope of the present invention.

Component (b) is at least one polyepoxy compound. Many types of polyepoxy compounds are known in the art and any of them are capable for use in the present invention. They include bisphenol diglycidyl ethers, epoxy novolacs, glycidyl adducts of amines and amides, glycidyl adducts of carboxylic acids, polymers of unsaturated epoxides and compounds prepared by epoxidation of dienes or polyenes. The preferred polyepoxy compounds are poly(O— or N—epoxyalkyl)-substituted cyclic amides, imides and imidates, usually containing one non-epoxy cyclic moiety although compounds with linked or fused moieties are also contemplated.

Most often, component (b) is a compound in which the epoxyalkyl groups are bonded directly to the oxygen or nitrogen atoms; however, compounds containing intervening structure, such as 2-carboglycidyloxyethyl compounds, may also be used. The presence of more than one epoxy group per molecule is essential. At least three of such groups are highly preferred, with three being especially preferred, by reason of the ease of preparation therefrom of branched polyesters with a minimum of crosslinking and resulting gel formation.

Illustrative cyclic nuclei which may be present in component (b) are the triazine, barbiturate, hydantoin, uracil, pyromellitic diimide, piperazinedione and parabanate ring system. As previously noted, the epoxy containing functionalities may be present as substituents on oxygen or nitrogen atoms therein, with nitrogen atoms frequently being preferred. The most suitable compounds are triazine derivatives, including triglycidyl cyanurate and TGIC. TGIC is particularly preferred by reason of its availability and particular suitability for the formation of branched polyesters. It has the formula

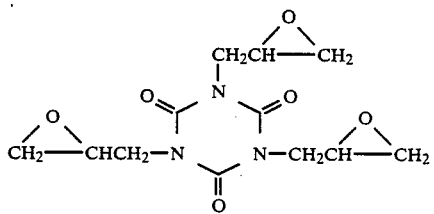

Other suitable triazine derivatives or N-methyl-N', N"-diglycidyl isocyanurate of the formula

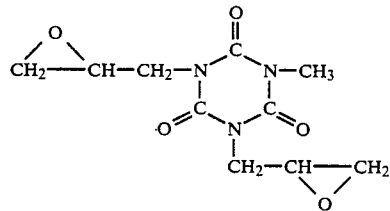

and triglycidyl cyanurate of the formula

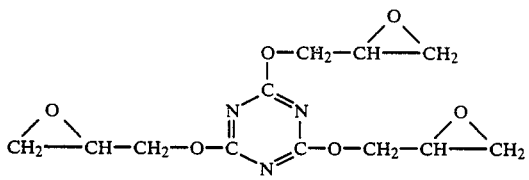

Component (c) of the present invention comprises a hindered phenol thermal stabilizer. Any hindered phenol known to those skilled in the art may be employed herein, a wide variety of these are commercially available.

Hindered phenols will generally be of the type in which there is a sterically hindered phenolic group, especially one containing a t-butyl group in the o-position to the phenolic OH- group. Examples of such compounds are many. Preferred examples are, tetrakis (methylene-3-(3',5'-di-tert-butyl-4'-hydroxyphenyl) propionate)methane; octadecyl-3-(3',5'-di-tert-butyl-4'-hydroxyphenyl)propionate; 1,3,5-trimethyl-2,4,6-tris (3,5-di-tert-butyl-4-hydroxybenzyl)benzene; 4,4'-(2,2phenylpropyl)diphenylamine; esters of ethoxylated aryl phenols; 2,2'-thiodiethylbis(3-(3,5-di-tert-butyl-4-hydroxyphenyl))propionate; octadecyl-3,5-di-tert-butyl-4-hydroxyhydrocinnamate and mixtures of any of the foregoing. Most preferred is octadecyl-3,5-di-tert-butyl-4-hydroxyhydrocinnamate, which is commercially available as Irganox ® 1076.

The essential feature of the present invention is the employment of an additional catalyst component (d) for the polyester-polyepoxy compound reaction. Suitable catalysts are in two classes, the first of which consists of primary alkylamines in which the alkyl group contains at least about 8 and preferably about 10–20 carbon atoms. Illustrative amines of this type include octylamine, decylamine, dodecylamine, tetradecylamine, pentadecylamine and eicosylamine. Included is the use of mixtures containing such amines, some of which are commercially available as accelerators for crosslinking of polyepoxy compounds. For example, the mixture of a long chain amine, a long chain quaternary ammonium salt and stannous octoate in a polymeric medium sold by Ciba-Geigy under the designation "XB3126" is suitable for use as a catalyst.

The second class of catalytic compounds consist of salts free from direct carbon-phosphorus bonds and containing at least one of alkali and alkaline earth metal cations and halide anions. It is apparent that this class contains a large number of compounds. They include alkali metal halides, alkali metal carboxylates, alkali metal enolates, amine hydrohalides and quaternary ammonium halides. Illustrative compounds within this class are lithium fluoride, lithium iodide, potassium bromide, sodium dihydrogen phosphate, sodium acetate, sodium benzoate, sodium caproate, sodium stearate, sodium ascorbate and dodecyltrimethylammonium bromide.

At high temperatures, as under melt conditions, thermoplastic polyesters undergo hydrolysis and molecular weight degradation by traces of water. Therefore, it is highly preferred for the catalyst to be free from substantial quantities of water. In general, water proportions greater than those present in a monohydrate of the catalyst should be avoided. It is generally advisable to employ anhydrous and/or non-hygroscopic salts as catalysts.

Salts of aliphatic carboxylic acids containing at least about 18 carbon atoms, especially the alkali metal stearates and preferably sodium stearate, have certain advantages over the other catalysts employed according to the invention and are therefore often preferred. In the first place, their use permits extrusion of the polyester-polyepoxide composition at substantially higher feed rates than those which are effective in their absence. In the second place, they tend to suppress the formation of acrolein, a by-product from glycidyl reagents such as TGIC. In the third place, they impart substantially less odor to the composition than certain other compounds useful as catalysts, especially amines.

The proportion of polyepoxy compound employed according to the present invention is generally about 0.05–3.0 parts by weight per 100 parts of polyester. The catalyst is employed in an amount effective to afford a product having a higher melt viscosity than is the case in its absence; said amount can be determined by simple experimentation. In general, about 0.01–0.5 parts per 100 parts of polyester is operative. For alkali metal stearates, about 0.01–0.20 parts is preferred.

The invention requires effecting reaction between the polyester and polyepoxy compound in the presence of the catalyst to form a branched polyester resin. Conventional blending methods may be used to effect reaction. Melt blending methods are typically employed, frequently preceded by a dry blending step. A melt blending operation which is often preferred is extrusion, ordinarily at temperatures in the range of about 200°–300° C. Any conventional extruder known to those skilled in the art may be employed.

TGIC and similar compounds are typically supplied as powders which may agglomerate into coarse particles. These particles are frequently difficult to mix uniformly with the other components during extrusion, and may result in regions of gel formation which produce flaw sites in formed articles. Moreover, many such compounds are irritants and/or health hazards. For example, TGIC may have mutagenic properties. Contact with the body and inhalation should therefore be avoided as much as possible.

For this reason, it is frequently preferred to initially prepare a concentrate by blending a relatively large amount of the polyepoxide with the polyester. Concentrates of this type may be prepared by melt blending or solution blending techniques as appropriate, and typically contain about 3-20 parts by weight of polyepoxide per 100 parts of polyester.

The concentrates thus prepared are essentially indistinguishable in appearance and physical behavior from the resin used for their preparation. No obvious indicia of phase separation are observed therein. The concentrate is dust-free and may be handled with minimum skin contact with and inhalation of the polyepoxide. It may be readily pelletized for easy handling. By the preparation of (for example) one batch of such a concentrate, continued or repeated handling of polyepoxide is made unnecessary. Reference is again made to the aforementioned copending applications Ser. Nos. 125,859 and 184,534 for further details of the preparation of branched polyester compositions via concentrates.

When such concentrates are employed, the catalyst may be incorporated in the mixture at the time of preparation of the concentrate and/or when the concentrate is subsequently blended with further polyester. Subsequent blending of catalyst is often especially preferred.

The compositions of the present can also comprise any number of conventional additives, such as dyes, pigments, stabilizers, plasticizers, flame retardants, drip retardants and the like can be added for their conventionally employed purposes. Illustrative flame retardant additives are disclosed in U.S. Pat. Nos. 3,833,685; 3,341,154; 3,915,926 and 3,671,487. Other flame retardants are disclosed in U.S. Pat. Nos. 3,681,281; 3,557,053; 3,830,771 and United Kingdom Patent No. 1,358,080.

Generally speaking, the more important of the flame retardant compounds contain chemical elements employed for their ability to impart flame resistance, e.g., bromine, chlorine, antimony, phosphorous and nitrogen. It is preferred that the flame-retardant additive comprise a halogenated organic compound (brominated or chlorinated); a halogenated-containing organic compound in admixture with a phosphorous compound or compounds containing phosphorous-nitrogen bonds or a mixture of two or more of the foregoing.

The amount of flame retardant additive used is not critical to the present invention, so long as it is present in a minor proportion based on said composition, major proportions will detract from physical properties, but at least sufficient to render the polyester resin non-burning or self-extinguishing. Those skilled in the art are well aware that the amount will vary with the nature of the resin and with the efficiency of the additive. In general, however, the amount of additive will be from 0.5 to 50 parts by weight per 100 parts of resin.

A preferred range will be from about 3 to 25 parts and an especially preferred range will be from about 8 to 12 parts of flame retardant additive per 100 parts of resin. Smaller amounts of compounds highly concentrated in the elements responsible for flame-retardance will be sufficient, e.g. elemental red phosphorous will be preferred at 0.5 to 2.0 parts by weight per hundred parts of resin, while phosphorous in the form of triphenyl phosphate will be used at 25 parts of phosphate per 100 parts of resin, and so forth. Halogenated aromatics will be used at 8 to 12 parts and synergists, e.g., antimony oxide, will be used at about 2 to 5 parts by weight per 100 parts of resin.

The preferred halogen compounds for this invention are aromatic halogen compounds such as brominated phthalimides, brominated polystyrene, brominated aryl ethers, halogenated bisphenols, polycarbonate polymers of halogenated bisphenols, brominated biphenyl, brominated terphenyl, or a compound comprising two phenyl radicals separated by a divalent alkylene or oxygen group and having at least two chlorine or bromine atoms per phenyl nucleus, and mixtures of at least two of the foregoing. Especially preferred are brominated phthalimides and polycarbonate oligomers of brominated bisphenols, alone, or mixed with antimony oxide.

In general, the preferred phosphate compounds are selected from elemental phosphorous or organic phosphonic acids, phosphonates, phosphinates, phosphonites, phosphinites, phosphene oxides, phosphenes, phosphites or phosphates. Illustrative is triphenyl phosphene oxide. This can be used alone, or mixed with brominated phthalimides or halogenated polycarbonates and, optionally, antimony oxide.

The compositions of the present invention may also comprise a drip retardant agent. These are described in U.S. Pat. No. 3,671,487. Generally, the drip retardant agent comprises a polytetrafluoroethylene resin, which is commercially available or can be prepared by known processes. They are white solids obtained by polymerization of the tetrafluoroethylene in aqueous media with free radical catalysts, e.g., sodium, potassium or ammonium peroxydisulfates at 100 to 1,000 psi and at 0°-200° C. and preferably 200°-100° C. See Brubaker, U.S. Pat. No. 2,393,967.

DESCRIPTION OF THE PREFERRED EMBODIMENTS

The following specific examples illustrate the present invention. However, they are not to be construed to limit the claims in any manner whatsoever.

EXAMPLES 1-2

215 g of a polybutylene terephthalate (Valox ® 315, General Electric Company) concentrate (3.5 weight percent TGIC) (RBC) is placed in a mechanical blender. To this is added 10 g of Irganox ® 1076 and varying amounts of sodium stearate and additional Valox ® 315. The composition is then dry blended. The final TGIC concentration of the blends is 0.15 weight percent. The mixture is then loaded into a 2.5 inch single screw extruder and compounded at 110 rpm and at a barrel set temperature of 480° F. A comparison is made with a blend without Irganox ® 1076. The results are set forth in Table 1.

TABLE 1

| Example | A* | B* | 1 | 2 |
|---|---|---|---|---|
| Composition (wt %) | | | | |
| Valox ® 315 | 99.65 | 99.60 | 99.55 | 99.7 |

TABLE 1-continued

| Example | A* | B* | 1 | 2 |
|---|---|---|---|---|
| TGIC | 0.15 | 0.15 | 0.15 | 0.15 |
| Irganox ® 1076 | 0.2 | 0.2 | 0.2 | — |
| NaSt | — | 0.05 | 0.10 | 0.15 |
| Properties | | | | |
| Melt Viscosity, poise | 32,400 | 33,100 | 35,500 | 35,200 |

\* = Comparative Example
NaSt = Sodium Stearate
Valox ® 315 = poly(1,4-butylene terephthalate), General Electric Company Table 1 above demonstrates that the addition of an effective amount of an additional catalyst compound, here sodium stearate, significantly increases the melt viscosity of a polyester composition over a polyester composition with equivalent amounts of a polyepoxy compound and hindered phenol but without the additional catalyst compound.

EXAMPLE 3

To a blender is added RBC (3.5 weight percent TGIC in Valox ® 315) and desired amounts of sodium stearate and Irganox ® 1076. The mixture is dry blended and loaded into a hopper. In a second hopper is loaded additional Valox ® 315. The blend and the Valox ® 315 are then metered into a 58 mm twin screw extruder operated at 350 rpm and at a barrel set temperature of 500° F., such that the final TGIC concentration in the composition is 0.15 weight percent. The mixture is extruded and the results along with comparative examples are set forth in Table 2 below.

TABLE 2

| Example | 3A* | 3B* | 3 |
|---|---|---|---|
| Composition (wt %) | | | |
| Valox ® 315 | 99.65 | 99.80 | 99.60 |
| TGIC | 0.15 | 0.15 | 0.15 |
| Irganox ® 1076 | 0.2 | — | 0.2 |
| NaSt | — | 0.05 | 0.05 |
| Properties | | | |
| Melt Viscosity, poise | 16,800 | 10,500 | 27,500 |

\* = Comparative Example

Table 2 above demonstrates the vast increase in melt viscosity obtained in a polyester resin composition employing the additional catalyst compound.

EXAMPLES 4-6

The procedure of Example 1 is repeated except the amounts of TGIC employed are varied. The results are set forth in Table 3 below.

TABLE 3

| Example | 4 | 5 | 6 |
|---|---|---|---|
| Composition (wt %)* | | | |
| Valox ® 315 | 96.85 | 95.45 | 94.05 |
| NaSt | 0.05 | 0.05 | 0.05 |
| Irganox ® 1076 | 0.2 | 0.2 | 0.2 |
| TGIC | 0.1 | 0.15 | 0.2 |
| Properties | | | |
| Melt viscosity, poise | 25619 | 46649 | 98764 |
| Izod Impact, notched, ft-lbs/in | 1.111 | 1.185 | 1.312 |
| Tensile Elongation, % | 37.79 | 45.54 | 54.42 |
| Tensile Strength, psi | 7926 | 7793 | 7721 |
| Flexural Strength, psi | 14,400 | 14,410 | 14,390 |
| Flexural Modulus, psi | 377,700 | 374,800 | 377,600 |

TABLE 3-continued

| Example | 4 | 5 | 6 |
|---|---|---|---|
| Specific Gravity | 1.3177 | 1.3131 | 1.3133 |

\* = final composition weight percents

Table 3 above demonstrates the increased melt viscosity of compositions of the present invention with varying amounts of TGIC.

The above mentioned patents, patent applications and Test Methods are all hereby incorporated by reference.

Many variations of the present invention will suggest themselves to those skilled in this art in light of the above detailed description. For example, instead of poly(1,4-butylene terephthalate), other polyester resins such as a poly(ethylene terephthalate), a poly(1,4-cylcohexanedimethyl terephthalate) or mixtures thereof may be employed. Additionally, a number of polyepoxide compounds may be used, e.g., a bisphenol diglycidyl ether, an epoxy novolac, N-methyl-N', N''-diglycidyl isocyanurate, and triglycidyl cyanurate. A number of hindered phenols are also contemplated for use herein in addition to Irganox ® 1076. These include esters of ethoxylated aryl phenols, tetrakis(methylene-3-(3',5'-di-tert-butyl-4'-hydroxyphenyl)propionate) methane, octadecyl-3-(3',5-di-tert-butyl-4'-hydroxyphenyl) propionate, 1,3,5-trimethyl-2,4,6-tris(3,5-di-tert-butyl-4-hydroxybenzyl)benzene; 4,4'-(2,2-phenylpropyl) diphenylamine, and 2,2'-thiodiethylbis(3-(3,5-di-tert-butyl-4-hydroxyphenyl))propionate. Also contemplated for use herein as an additional catalyst compound are potassium bromide, lithium iodide, lithium fluoride, sodium acetate, sodium caproate, sodium benzoate, sodium ascorbate, sodium dihydrogen phosphate, dodecyltrimethylammonium bromide and mixtures thereof.

It is further contemplated to prepare the compositions by first melt blending a concentrate of the polyester resin and polyepoxy compound and later adding the hindered phenol, additional catalyst and an additional amount of polyester resin. Flame retardants, such as a brominated polycarbonate or brominated phthalimide in admixture with antimony oxide may also be added to the compositions of the present invention.

All such obvious modifications are within the full intended scope of the appended claims.

I claim:

1. In a thermoplastic resin composition comprising:
   (a) a polyester resin;
   (b) a polyepoxy compound;
   (c) a hindered phenol thermal stabilizer; the improvement comprising (d) an effective amount of at least one additional catalyst compound; whereby either (1) the viscosity of the composition is increased over a composition with equivalent amounts of components (a), (b) and (c); or (2) a composition having the same viscosity as a composition of (a), (b) and (c) is obtained but with a reduction in the amount of (b) employed.

2. A composition as defined in claim 1 wherein said component (a) polyester resin comprises units of an aliphatic diol, a cycloaliphatic diol or a mixture of such diols and an aromatic diacid.

3. A composition as defined in claim 2 wherein said component (a) polyester resin consists essentially of a poly(1,4-butylene terephthalate).

4. A composition as defined in claim 2 wherein said component (a) polyester resin consists essentially of a poly(ethylene terephthalate).

5. A composition as defined in claim 2 wherein said component (a) polyester resin consists essentially of a blend of a poly(1,4-butylene terephthalate) and a poly(ethylene terephthalate).

6. A composition as defined in claim 1 wherein said component (a) polyester resin consists essentially of a poly(1,4-cyclohexanedimethyl terephthalate).

7. A composition as defined in claim 1 wherein said component (a) polyester resin has an intrinsic viscosity of at least about 0.4 deciliters per gram when measured in a 60:40 mixture of phenol and trichloroethane at 30° C.

8. A composition as defined in claim 1 wherein said polyepoxy compound comprises a poly(Oor N-epoxyalkyl)-substituted cyclic amide, imide or imidate.

9. A composition as defined in claim 8 wherein said polyepoxy compound comprises a single triazine, barbiturate, hydantoin, uracil, pyromellitic diimide, piperazinedione or parabanate group and the epoxyalkyl groups therein are bonded directly to oxygen or nitrogen atoms.

10. A composition as defined in claim 9 wherein said polyepoxy compound is selected from the group consisting essentially of triglycidyl isocyanurate N-methyl-N',N''-isocyanurate, triglycidyl cyanurate and a mixture of any of the foregoing.

11. A composition as defined in claim 10 wherein said polyepoxy compound consists essentially of triglycidyl isocyanurate.

12. A composition as defined in claim 1 wherein said hindered phenol thermal stabilizer is selected from the group consisting essentially of tetrakis(methylene-3-(3',5'-di-tert-butyl-4'-hydroxy phenyl)propionate)methane; octadecyl-3-(3',5'-di-tert-butyl-4'-hydroxyphenyl)propionate; 1,3,5-trimethyl-2,4,6-tris(3,5-di-tert-butyl-4-hydroxybenzyl) benzene; 4,4'-(2,2-phenylpropyl)diphenylamine, esters of ethoxylated aryl phenols; 2,2'-thiodiethylbis(3-(3,5-di-tert-butyl-4-hydroxyphenyl))propionate, octadecyl-3, 5-di-tert-butyl-4-hydroxyhydrocinnamate, and mixture of any of the foregoing.

13. A composition as defined in claim 12 wherein said hindered phenol thermal stabilizer consists essentially of octadecyl-3,5-di-tert-butyl-4-hydroxyhydrocinnamate.

14. A composition as defined in claim 1 wherein said catalyst compound is selected from the group consisting of (1) primary alkylamines in which the alkyl group contains at least about 8 carbon atoms and (2) salts free from direct carbon-phosphorous bonds and containing at least one of alkali and alkaline earth metal cations and halide anions.

15. A composition as defined in claim 14 wherein said catalyst compound comprises a primary alkylamine containing about 10 to 20 carbon atoms.

16. A composition as defined in claim 14 wherein said catalyst compound is selected from the group consisting of potassium bromide, lithium iodide, lithium fluoride, sodium acetate, sodium caproate, sodium benzoate, sodium stearate, sodium ascorbate, sodium dihydrogen phosphate, dodecyltrimethylammonium bromide and mixtures thereof.

17. A composition as defined in claim 14 wherein said catalyst compound comprises an alkali metal salt of an aliphatic carboxylic acid containing at least about 10 carbon atoms.

18. A composition as defined in claim 16 wherein said catalyst compound comprises sodium stearate.

19. A composition as defined in claim 1 wherein said composition comprises at least about 0.05 parts by weight of said polyepoxy compound component (b), at least about 0.1 parts by weight of said hindered phenol stabilizer component (c) and at least about 0.01 parts by weight of said catalyst compound component (d) based on 100 parts by weight of said polyester resin component (a).

20. A composition as defined in claim 1 which also comprises (e) an effective amount of a flame retardant agent.

21. A composition as defined in claim 20 wherein said component (e) flame retardant agent is selected from the group consisting of a halogen-containing compound, a halogen-containing compound in admixture with a synergist, elemental phosphorous or a phosphorous compound, a halogen-containing compound in admixture with a phosphorous, and mixtures of any of the foregoing; wherein said flame retardant is present in an amount of from 0.5 to 50 parts by weight per 100 parts by weight of polyester resin.

22. A composition as defined in claim 21 wherein said halogen-containing compound in admixture with a synergist comprises brominated polycarbonate in admixture with antimony oxide or brominated phthalimide in admixture with antimony oxide.

23. A composition as defined in claim 1 wherein said composition also comprises (f) a drip retardant agent.

24. A method for producing an improved thermoplastic resin composition comprising (i) melt blending a composition comprising
  (a) a polyester resin;
  (b) a polyepoxy compound;
  (c) a hindered phenol thermal stabilizer; (ii) and adding an effective amount of at least one additional catalyst compound; whereby either (1) the viscosity of the composition is increased over a composition comprising equivalent amounts of compounds (a), (b) and (c); or (2) the viscosity of the composition is the same and the amount of component (b) employed is reduced.

25. A method as defined in claim 24 wherein said component (a) polyester resin comprises units of an aliphatic diol, a cycloaliphatic diol or a mixture of such diols and an aromatic diacid.

26. A method as defined in claim 25 wherein said component (a) polyester resin consists essentially of poly(1,4-butylene terephthalate).

27. A method as defined in claim 25 wherein said component (a) polyester resin consists essentially of poly(ethylene terephthalate).

28. A method as defined in claim 25 wherein said component (a) polyester resin consists essentially of a blend of poly(1,4-butylene terephthalate) and poly(ethylene terephthalate).

29. A method as defined in claim 24 wherein said component (a) polyester resin consists essentially of a poly(1,4-cyclohexanedimethyl terephthalate).

30. A method as defined in claim 24 wherein said component (a) polyester resin has an intrinsic viscosity of at least about 0.4 deciliters per gram when measured in a 60:40 mixture of phenol and trichloroethane at 30° C.

31. A method as defined in claim 24 wherein said polyepoxy compound comprises a poly(O— or N—epoxyalkyl)-substituted cyclic amide, imide or imidate.

32. A method as defined in claim 31 wherein said polyepoxy compound comprises a single triazine, barbiturate, hydantoin, uracil, pyromellitic diimide, piperazinedione or parabanate group and the epoxyalkyl groups therein are bonded directly to oxygen or nitrogen atoms.

33. A method as defined in claim 32 wherein said polyepoxy compound is selected from the group consisting of triglycidyl isocyanurate, N-methyl-N',N''-diglycidyl isocyanurate, triglycidyl cyanurate and mixtures of any of the foregoing.

34. A method as defined in claim 33 wherein said polyepoxy compound comprises triglycidyl isocyanurate.

35. A method as defined in claim 24 wherein said hindered phenol thermal stabilizer is selected from the group consisting essentially of tetrakis(methylene-3-(3',5'-di-tert-butyl-4'-hydroxyphenyl)propionate)methane; octadecyl-3-(3',5'-di-tert-butyl-4'-hydroxyphenyl) propionate; 1,3,5-trimethyl-2,4,6-tris(3,5-di-tert-butyl-4-hydroxybenzyl)benzene; 4,4'-(2,2-phenylpropyl) diphenylamine, esters of ethoxylated aryl phenols; 2,2'-thiodiethylbis(3-(3,5-di-tert-butyl-4-hydroxyphenyl))propionate, octadecyl-3,5-di-tert-butyl-4-hydroxyhydrocinnamate, and mixtures of any of the foregoing.

36. A method as defined in claim 35 wherein said hindered phenol thermal stabilizer consists essentially of octadecyl-3,5-di-tert-butyl-4-hydroxyhydrocinnamate.

37. A method as defined in claim 24 wherein said catalyst compound is selected from the group consisting of (1) primary alkylamines in which the alkyl group contains at least about 8 carbon atoms and (2) salts free from direct carbon-phosphorous bonds and containing at least one of alkali and alkaline earth metal cations and halide anions.

38. A method as defined in claim 37 wherein said catalyst compound comprises a primary alkylamine containing about 10 to 20 carbon atoms.

39. A method as defined in claim 37 wherein said catalyst compound is selected from the group consisting of potassium bromide, lithium iodide, lithium fluoride, sodium acetate, sodium caproate, sodium benzoate, sodium stearate, sodium ascorbate, sodium dihydrogen phosphate, dodecyltrimethylammonium bromide and mixtures thereof.

40. A method as defined in claim 37 wherein said catalyst compound comprises an alkali metal salt of an aliphatic carboxylic acid containing at least about 10 carbon atoms.

41. A method as defined in claim 40 wherein said catalyst compound comprises sodium stearate.

42. A method as defined in claim 24 wherein said composition comprises at least about 0.05 parts by weight of said polyepoxy compound component (b), at least about 0.1 parts by weight of said hindered phenol stabilizer component (c) and at least about 0.01 parts by weight of said catalyst compound component (d) based on 100 parts by weight of said polyester resin component (a).

43. A method as defined in claim 24 wherein said method is carried out in an extruder.

44. A method as defined in claim 24 which also comprises (e) an effective amount of a flame retardant agent.

45. A method as defined in claim 44 wherein said component (e) flame retardant agent is selected from the group consisting of a halogen-containing compound, a halogen-containing compound in admixture with a synergist, elemental phosphorous or a phosphorous compound, a halogen-containing compound in admixture with a phosphorous, and mixtures of any of the foregoing; wherein said flame retardant is present in an amount of from 0.5 to 50 parts by weight per 100 parts by weight of polyester resin.

46. A method as defined in claim 45 wherein said halogen-containing compound in admixture with a synergist comprises brominated polycarbonate in admixture with antimony oxide or brominated phthalimide in admixture with antimony oxide.

47. A method as defined in claim 46 wherein said composition also comprises (f) a drip retardant agent.

48. A method for producing an improved thermoplastic resin composition comprising
  (i) melt blending
    (a) a relatively major amount of a polyester resin; and
    (b) a relatively minor amount of a polyepoxy compound; to form a resin concentrate, and
  (ii) adding
    (c) a hindered phenol thermal stabilizer; and
    (d) an effective amount of at least one additional catalyst; to said resin concentrate; and
    (e) an additional amount of said polyester resin (a) to the resin obtained in step (i); whereby either (1) the viscosity of the composition is increased over a composition comprising equivalent amounts of (a), (b) and (c); or (2) the viscosity of the composition is the same and the amount of component (b) employed is reduced.

49. A method as defined in claim 48 wherein either component (c) or component (d) or both (c) and (d) are included in step (i).

50. A method as defined in claim 48 wherein said resin concentrate comprises said polyepoxy compound in an amount ranging from about 1.0 to about 4.0 weight percent based on the total weight of said resin concentrate.

* * * * *